Oct. 10, 1944.  C. A. BRITTEN  2,360,103
OLIVE-PITTING MACHINE
Filed Nov. 10, 1941  6 Sheets-Sheet 1
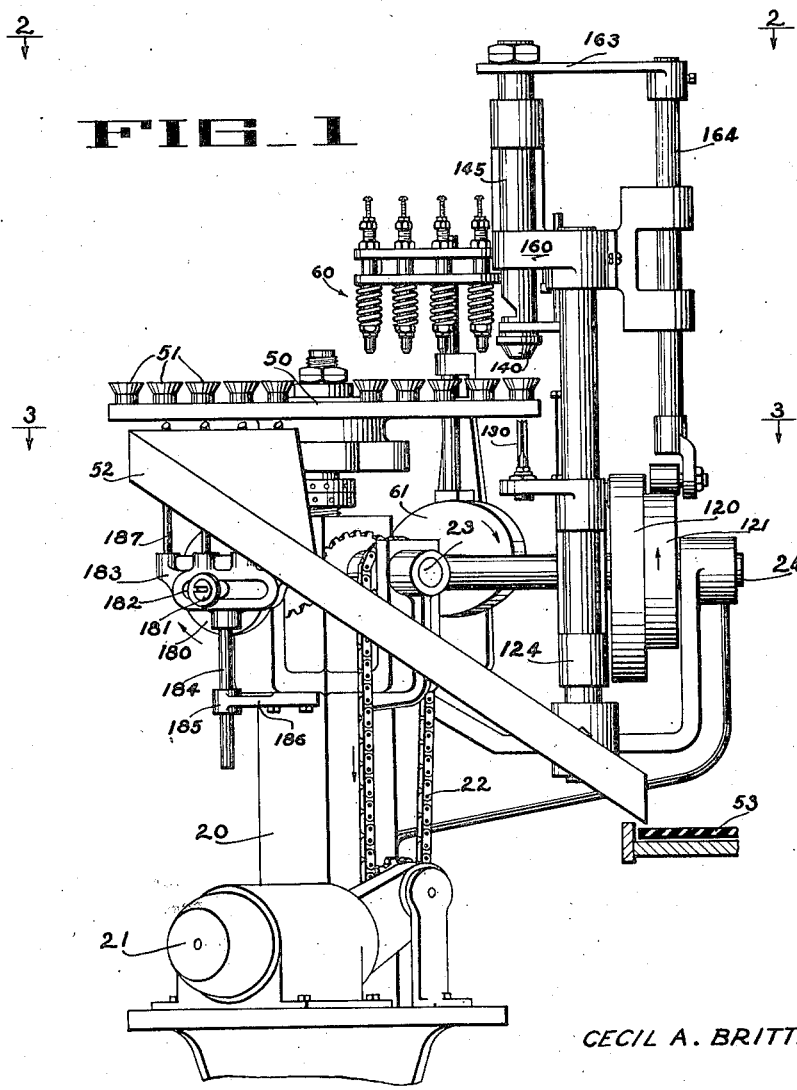
Inventor
CECIL A. BRITTEN
By Philip G. Minnis
Attorney Oct. 10, 1944.  C. A. BRITTEN  2,360,103
OLIVE-PITTING MACHINE
Filed Nov. 10, 1941  6 Sheets-Sheet 2
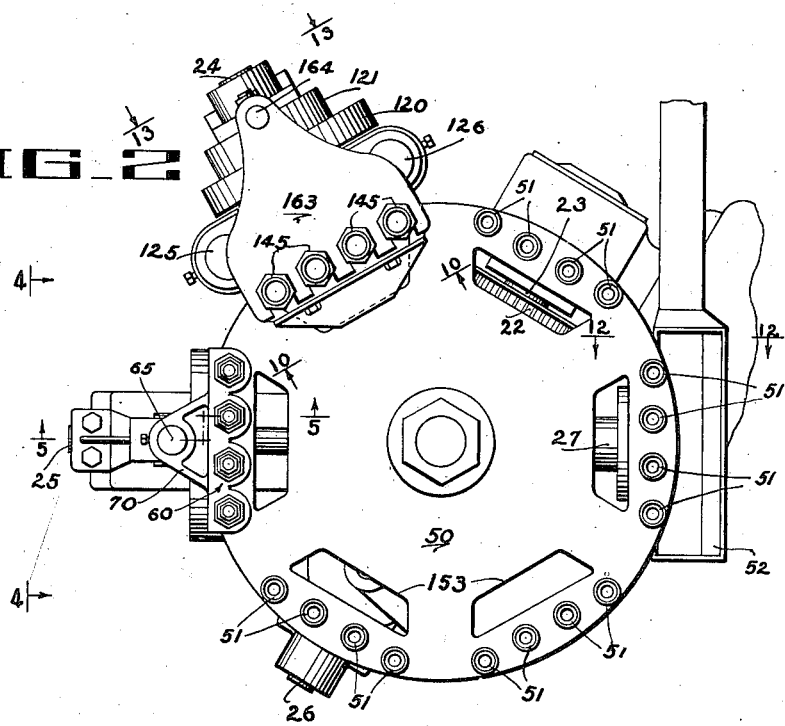
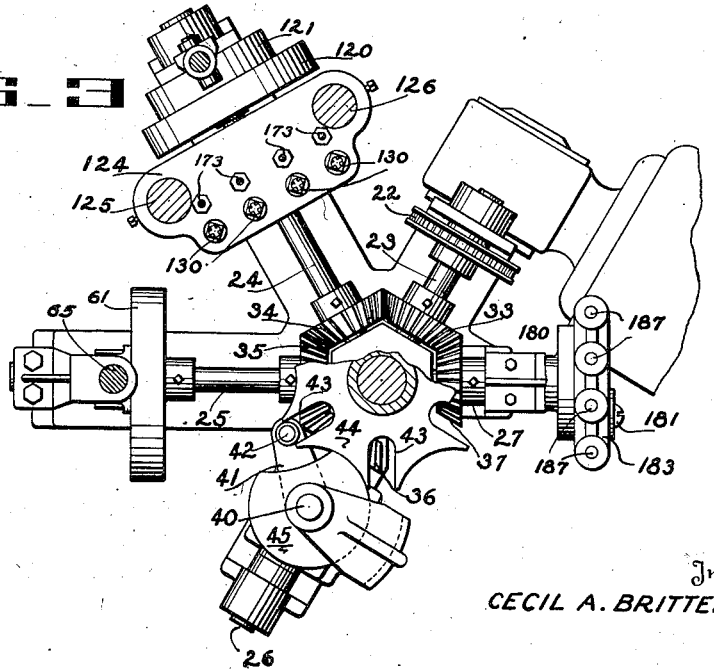
Inventor
CECIL A. BRITTEN
By Philip A. Minnis
Attorney

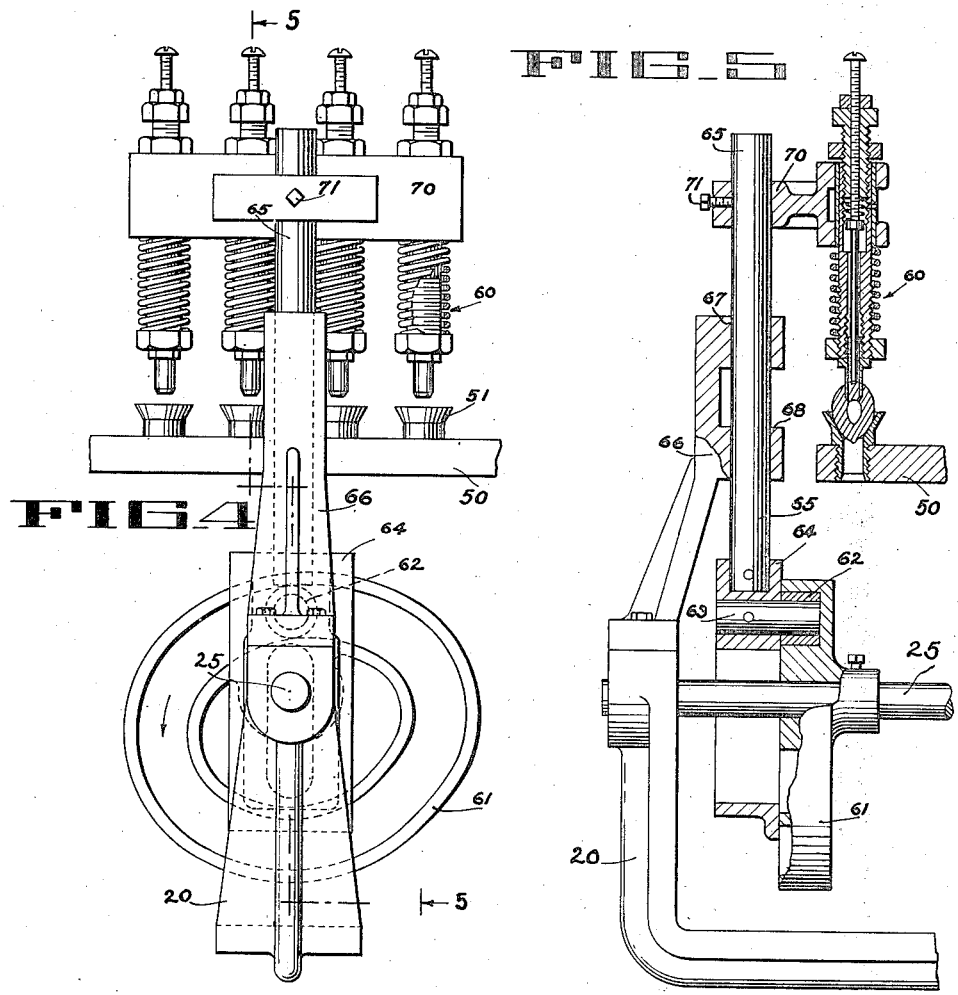
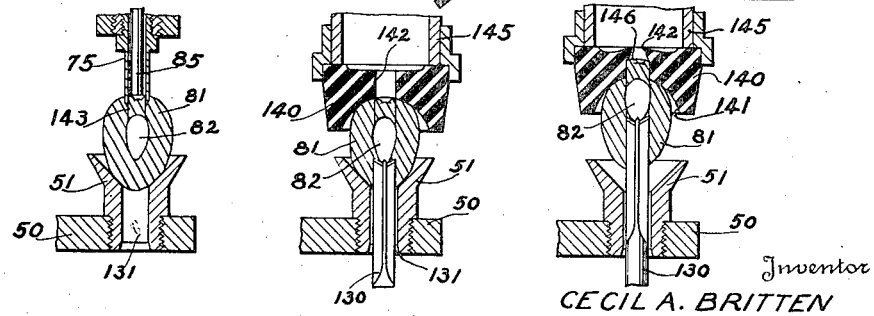

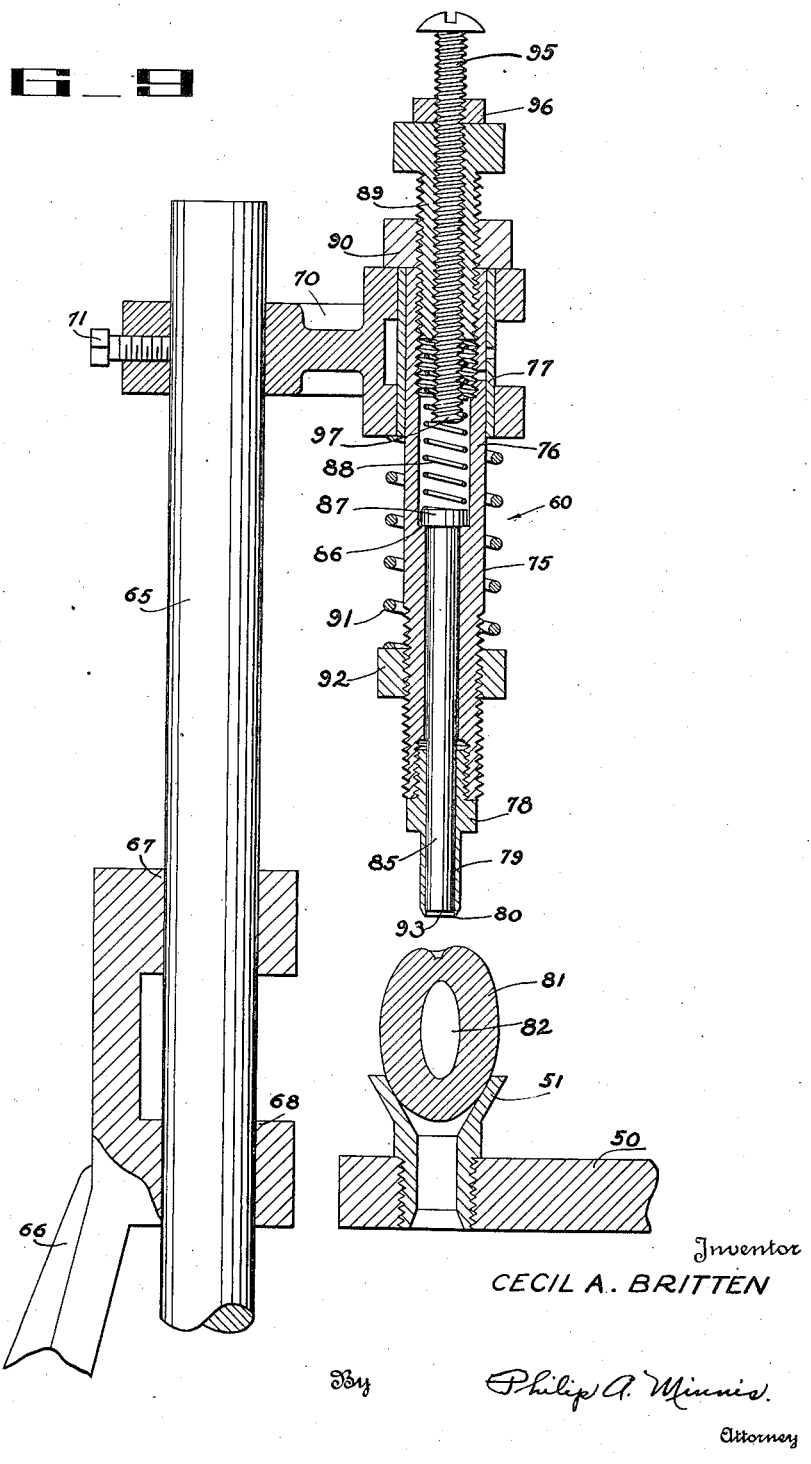

Oct. 10, 1944. C. A. BRITTEN 2,360,103
OLIVE-PITTING MACHINE
Filed Nov. 10, 1941 6 Sheets-Sheet 5
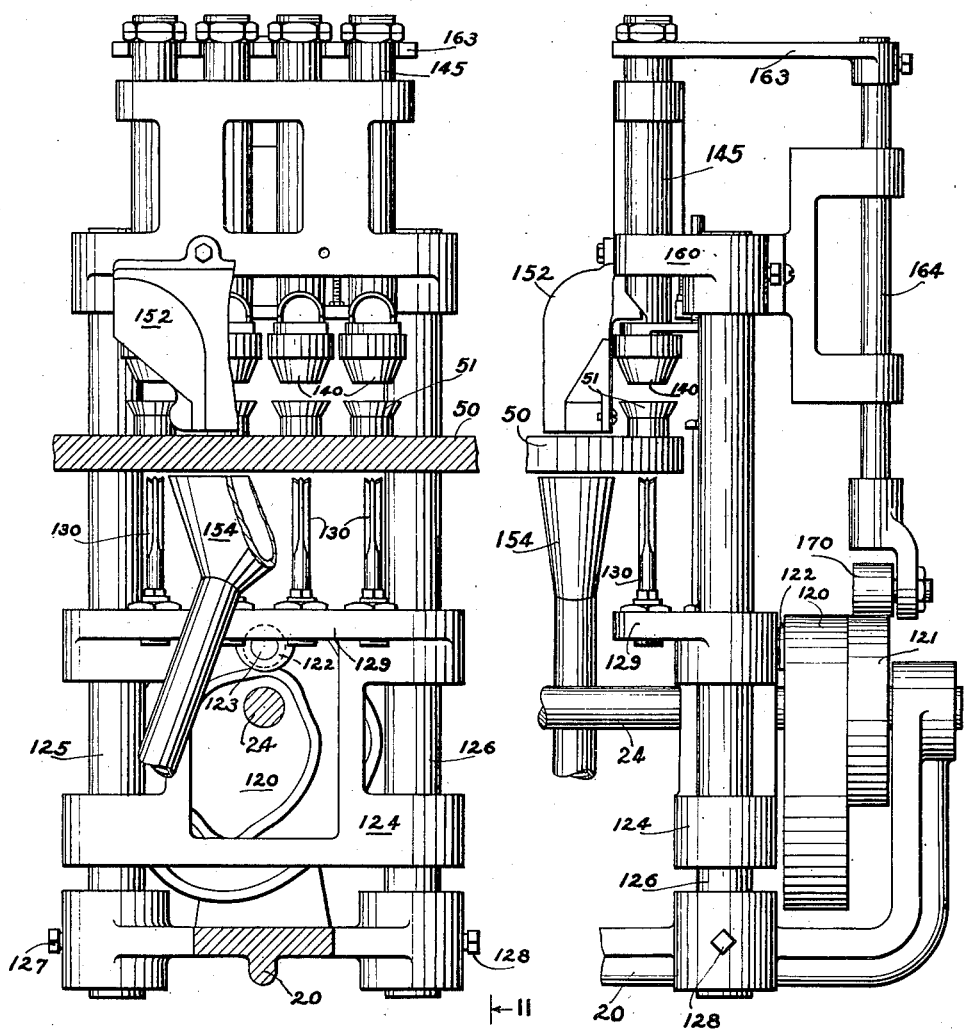
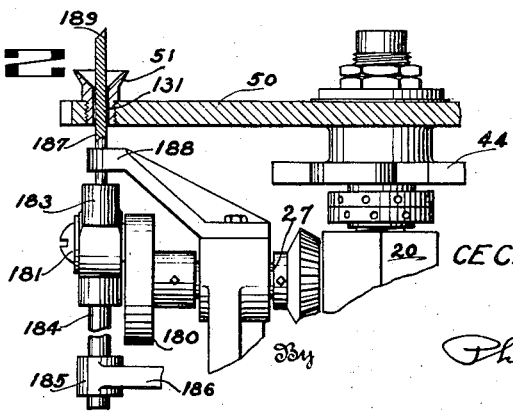
Inventor
CECIL A. BRITTEN

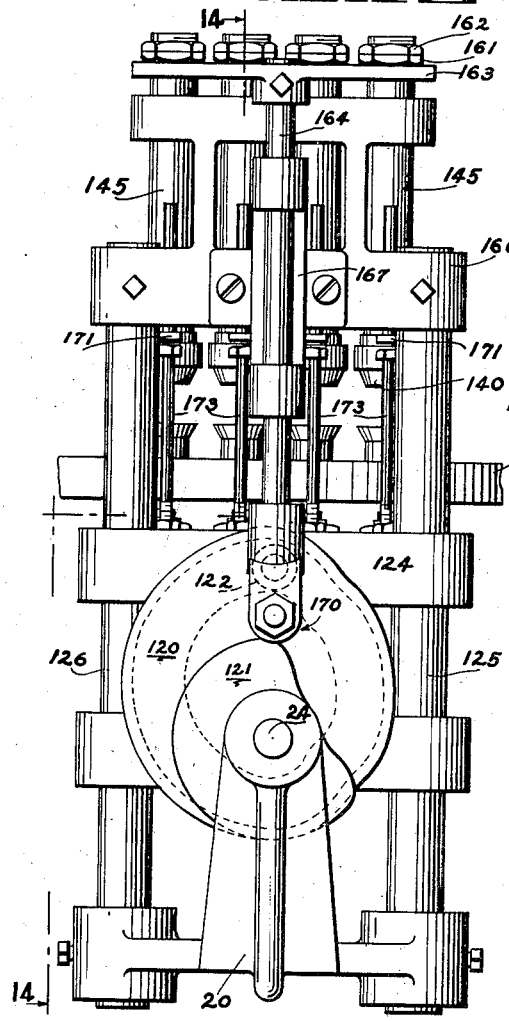

Patented Oct. 10, 1944

2,360,103

UNITED STATES PATENT OFFICE 2,360,103

OLIVE-PITTING MACHINE

Cecil A. Britten, San Jose, Calif., assignor to Food Machinery Corporation, San Jose, Calif., a corporation of Delaware Application November 10, 1941, Serial No. 418,481

13 Claims. (Cl. 146—27)

This invention relates to machines for removing the pits from olives.

The object of the invention is to provide a machine for pitting olives in accordance with the method disclosed and claimed in the copending application Serial No. 418,488, of Roy M. Magnuson, filed November 10, 1941.

Another object of the invention is to provide an olive-pitting machine in which an incision is made in each olive preparatory to removing the pit, through which incision the pit is subsequently removed.

A further object is to provide a mechanism for making said incision and particularly for controlling the depth of the incision.

Another object is to provide a mechanism capable of making a small incision in the olive of less diameter than the thickness of the pit.

A further object is to provide a pitting mechanism including a tool for forcing the pit out of the olive through the previously-made incision.

Other objects will be apparent after a disclosure of a machine embodying the invention.

In the drawings:

Fig. 1 is a side elevation of the machine.

Fig. 2 is a plan view of the machine taken as indicated by the arrows 2—2 in Fig. 1.

Fig. 3 is a horizontal section taken as indicated by the arrows 3—3 in Fig. 1.

Fig. 4 is a side elevation of the cutting mechanism taken as indicated by the arrows 4—4 in Fig. 2.

Fig. 5 is a vertical section thereof taken as indicated by the arrows 5—5 in Fig. 2.

Figs. 6 to 8 illustrate the steps in removing the pit from an olive.

Fig. 9 is an enlarged section of one of the knife assemblies.

Fig. 10 is an elevation of the pitting mechanism taken as indicated by the arrows 10—10 in Fig. 2.

Fig. 11 is a side elevation thereof taken as indicated by the arrows 11—11 in Fig. 10.

Fig. 12 is a sectional view of the ejector mechanism taken as indicated by the arrows 12—12 in Fig. 2.

Fig. 13 is an elevation of the pitting mechanism taken as indicated by the arrows 13—13 in Fig. 2.

Fig. 14 is a view partly in section and partly in elevation taken as indicated by the arrows 14—14 in Fig. 13.

Fig. 15 is a perspective view of a pitting prong.

Fig. 16 is a bottom view of a pitting rubber.

Fig. 17 is a vertical section thereof.

A general view of the machine appears in Fig. 1, where it will be observed that the machine is provided with a pedestal base 20, the lower portion of which has been broken off but which is adapted to rest on the floor. A source of power is provided for operating the various mechanisms in the machine and is preferably an electric motor 21 mounted on the base 20. The drive is transmitted through suitable power transmission means including a chain 22 to a drive shaft 23.

Referring to Fig. 3, drive shaft 23 is one of five shafts 23, 24, 25, 26, 27 which radiate horizontally from the vertical axis of the machine and are suitably supported in bearings in outwardly extending arms which form an integral part of the machine frame. The inner end of each shaft has a bevel gear thereon and these gears have been numbered 33, 34, 35, 36, 37, respectively. The drive gear 33 meshes with gears 34 and 37 to transmit rotation to shafts 24 and 27. Gear 34 meshes with gear 35 to transmit rotation to shaft 25 and gear 35 meshes with gear 36 to transmit rotation to shaft 26.

The shaft 26 is connected by bevel gearing (not shown) to a vertical shaft 40 on which is secured an arm 41 having a driving pin 42 in the end which engages in the slots 43 of a Geneva gear 44. Also secured to the shaft 40 is a conventional Geneva gear locking disk 45. The Geneva gear 44 is connected to a carrier in the form of a circular table 50 (Figs. 2 and 12) suitably supported for rotation about a vertical axis in the frame. This table is intermittently rotated sixty degrees as the Geneva drive pin 42 rotates continuously.

The purpose of the Geneva drive is to impart an intermittent indexing movement to the table. There are six groups of four olive-supporting cups 51 arranged as shown in Fig. 2 around the periphery of the table, the four cups in each group being placed in a straight line. The first sixty-degree movement of the table will carry the cup now located at the index position above the shaft 26 to the next index position above the shaft 25. The next time the table moves these cups will be carried to the next index position above the shaft 24. In the next cycle of the Geneva the cups will be indexed to a position above the shaft 23, and in the following cycle to a position above the shaft 27. As will presently be more apparent, this indexing of the table is utilized as follows: The olives are placed in the cups with their axes vertical in the index position above the shaft 26. The preceding position is also available for loading. Upon arrival at the next position above the shaft 25 a preparatory incision is made in the olives. The table then indexes to bring the olives to the position over the shaft 24 where the pits are removed through the incisions. When the olives reach the position over the shaft 27 they are ejected from the cups 51 and discharged into a chute 52 which deposits the pitted olives on a conveyor indicated at 53 in Fig. 1.

The mechanism for making the preparatory incision will now be described. In general it comprises a battery of four identical cutting tools 60 (Fig. 1) disposed above the table 50 at the index position associated with the shaft 25 (Fig. 2). Four tools are provided in order to simultaneously perform the cutting operation on four olives disposed in a group of four cups 51.

Means are provided for imparting a reciprocatory stroke of invariable length to the battery of cutting tools 60 during each rest period of the table 50. The shaft 25 has a cam 61 (Figs. 4 and 5) secured thereto having a track in which a roller 62 runs. The roller 62 is carried by a stub shaft 63 in a slide 64 having a vertically-extending reciprocatory rod 65 secured thereto. A bracket 66 secured to the frame 20 of the machine provides aligned bearings 67, 68 for the reciprocatory rod 65. A tool holder 70 (Figs. 2, 4 and 5) is adjustably secured to the upper end of the reciprocatory rod 65 by a set screw 71. The tool holder 70 and the rod 65 comprise a reciprocatory actuating means for the tools 60 which are carried in a line in the holder and are lowered and raised once in each revolution of the cam 61 which is timed to effect the tool movement during the rest period of the table 50.

Since the cutting tools 60 are identical only one will be described in detail. An enlarged section of one of these tools will be found in Fig. 9. The knife, indicated generally at 75, comprises a cylindrical shank 76, which is mounted for vertical sliding movement relative to the actuator 70 in a bearing 77, and a removable tip 78 threaded into the lower end thereof which is cylindrical in shape and provided with a central bore 79. The lower edge is beveled to form the circular cutting edge 80. The actuator 70 causes the knife 75 to make a cylindrical incision in the top of the olive 81 which is supported upright in the cup 51 on the table 50.

The cutting tool is constructed so that the depth of the incision may be controlled in two ways. The first is by contact of the cutting edge 80 with the top of the pit 82. A plunger or stop 85 is vertically slidable in the knife 75. The shank 76 is counterbored at the upper end to provide a shoulder 86 for the head 87 of the plunger to limit downward movement of the plunger relative to the knife. Relative movement in the opposite direction is opposed by a compression spring 88, the pressure of which can be adjusted by a screw 89 threaded into the counterbore of the shank 76. An adjusting nut 90 threaded on the screw 89 engages the top of the actuator 70 to limit downward movement of the knife 75 relative to the actuator and to adjust the lower limit position. As previously stated, the shank 76 is slidable in the bearing 77, but upward movement of the knife relative to the actuator is opposed by a compression spring 91 interposed between the underside of the actuator and an adjustable nut 92 threaded on the shank 76.

When gauging the depth of the incision by contact with the pit a knife having a cutting edge 80 smaller in diameter than the thickness of the pit 82 is employed. The cutting tool 60 operates to make the incision in the following manner: The actuator 70 descends. The cutting edge 80 penetrates the olive 81. The lower end 93 of the plunger 85 engages the surface of the olive. The force which causes the knife to penetrate the olive is transmitted thereto from the actuator 70 through the spring 91. When the cutting edge 80 contacts the top of the pit 82 the knife is arrested, continued downward movement of the actuator 70 resulting in compression of the spring 91. When the actuator 70 has completed its downward stroke it rises. The spring 91 expands. Then the actuator engages the nut 90 and positively withdraws the knife from the olive. The olive is retained in the cup 51 by the plunger 85 which is pressed downwardly by the spring 88. When the shoulder 86 picks up the head 87 of the plunger the cutting edge 80 is out of the olive and the knife and plunger rise together.

The other way in which the depth of the incision may be controlled is based on a predetermined depth of cut and does not depend upon contact of the knife with the pit. Accordingly this control may be used when a knife size larger in diameter than the thickness of the pit is employed. A stop screw 95 is threaded through the adjusting screw 89 and is locked in adjustment with a nut 96. The distance from the end 97 of the screw to the head 87 of the plunger will be the depth of the incision.

The operation is as follows: The actuator lowers the tool. The cutting edge 80 penetrates the olive, the plunger 85 being arrested when the end 93 engages the surface of the olive. As the cutting edge penetrates the olive the end 97 of the stop screw 95 approaches the head 87 of the plunger which is stationary. When the stop screw contacts the head of the plunger the knife is arrested, the actuator continuing its downward movement and compressing the spring 91. On the upward stroke of the actuator the plunger retains the olive in the cup as the knife is withdrawn in the same manner as before.

After the preparatory incision has been made the table indexes to the next position (Fig. 2) where the pit is removed by mechanism which will now be described. The shaft 24 has two cams 120, 121 thereon. Cam 120 (Figs. 10 and 11) is an internal cam and is provided with a track in which a roller 122 runs. The roller 122 is carried by a stub shaft 123 which is secured in a cross-head 124 guided for vertical reciprocation on two slide rods 125, 126 secured in the frame 20 by set screws 127, 128. The cross-head 124 has a ledge 129 formed integral therewith on which the pitting tools 130 are mounted.

When the roller 122 is in the rest portion of the cam track the pitting tools 130 are disposed beneath the table 50 as shown in Figs. 10 and 11. The cam is timed with the table so that after the table comes to rest the cross-head 124 rises elevating the pitting tools 130. To permit the tools to engage the olives each cup 51 (Fig. 7) has a bore 131 through which the tool passes. The pitting tool is formed as shown in Fig. 15, where it will be seen that the tool is fluted to provide a plurality of longitudinal fins 132 each of which terminates in a cutting edge 133 to facilitate its penetration into the olive. Furthermore, these cutting edges are inclined downwardly toward the axis of the tool so as to cradle the pit, as shown in Fig. 7.

A pitting rubber 140 (Fig. 7) is lowered over the olive 81 at this time to assist the pitting tool in removing the pit. The pitting rubber 140 (Figs. 16 and 17) has a concavity 141 in the underside in which the top of the olive is adapted to fit. The pitting rubber also has a central bore 142 the diameter of which is less than the diameter of the incision 143 (Fig. 6) made by the knife 75, and in case this incision is smaller in diameter than the thickness of the pit 82, the diameter of the bore 142 in the pitting rubber is less than the thickness of the pit.

As shown in Fig. 8 the pitting tool 130 lifts the olive 81 off the cup as it presses the upper end of the olive into the concavity 141 of the pitting rubber 140. The pitting rubber is also lifted slightly as can be seen by a comparison of Figs. 7 and 8. This is on account of the fact that the pitting rubber is carried in the lower end of a tube 145 which has a limited floating action to accommodate for variations in olive sizes, as will presently be more apparent. It will be noted in Fig. 8 that the piece of meat 146 attached to the top of the pit 82 is larger in diameter than the bore 142 in the rubber. As the pitting tool 130 pushes the pit out the top of the bore the rubber contracts around the lower end of the pit and forcibly ejects it upwardly against an inclined deflector 150 (Fig. 14) located in the tube 145 opposite a discharge opening 151 through which the pit is deflected into a discharge chute 152 that directs them through an opening 153 in the table 50 into a second discharge chute 154.

The tube 145 (Figs. 13 and 14) is vertically slidable in a bracket 160 attached to the slide rods 125, 126. An adjustable nut 161 and a lock nut 162 are threaded on the upper end of the tube 145. At the conclusion of the pitting operation the tube 145 is held in raised position by means of a fork 163 which engages the nut 161. The fork is secured to the upper end of a lift rod 164 slidable in bearings 165, 166 in a bearing bracket 167 attached to the bracket 160. A roller 170 carried by the lower end of the rod 164 follows a cam 121 on the shaft 24.

The cam is timed so that during the indexing movement of the table 50 it holds the rod and fork in elevated position to hold the tubes 145 in inoperative position. When the table has stopped the cam lowers the fork clear of the nuts 161, permitting the tubes to descend by gravity to lower the rubbers 140 onto the olives in the manner illustrated in Fig. 7. When the pitting tool 130 rises to engage the pit and force it upwardly out of the olive the tube 145 is lifted also. The weight of the tube usually supplies sufficient resistance to enable the tool to remove the pit. A stop 172 attached to the bracket 160 limits upward movement of the tube by engaging a lug 171 thereon if necessary. To prevent the tube from falling when there is no olive in the cup a stop 173 underlying the lug 171 is mounted on the cross-head 124.

At the conclusion of the pitting operation the cam 120 lowers the cross-head 124 which withdraws the pitting tools 130 from the olives, leaving the olives seated in the cups 51. The tools are finally lowered away free of the table as shown in Fig. 11. The cam 121 simultaneously lifts the fork 163 which holds the tubes 145 and pitting rubbers 140 in the elevated inoperative position. The table now indexes.

When the pitted olives arrive at the index position over the shaft 27 (Fig. 2) they are ejected from the cups 51 into the chute 52 by an ejector mechanism which will now be described. The shaft 27 has a crank 180 (Figs. 1 and 12) at the outer end, the crank pin 181 of which engages in a horizontal slot 182 formed in a carrier 183 which is guided for vertical reciprocation by means of a rod 184 depending therefrom into a bearing 185 in a bracket 186 attached to the frame 20. The carrier 183 has four upstanding ejector pins 187 which are guided for vertical sliding in a bracket 188. Upon rotation of the crank 180 the ejector pins 187 are projected up through the bores 131 in the cups 51 to push the olives up out of the cups. The end of each pin is beveled at 189 to discharge the olive laterally into the chute 52. The chute deposits the pitted olives on a conveyor 53 for removal from the machine.

Having thus described my invention and in what manner the same may be used, what I claim as new and desire to protect by Letters Patent is:

1. An olive-pitting machine having a table rotatable about a vertical axis, means to intermittently rotate said table to predetermined index positions, cups on said table to support the olives, means at one index position for making an incision in the olive including a vertically-reciprocable cylindrical knife, and means carried by said knife and yieldable relative to the long axis thereof to hold the olive in the cup when said knife withdraws from the olive after making the incision therein.

2. An olive-pitting machine having a table rotatable about a vertical axis, means to intermittently rotate said table to predetermined index positions, cups on said table to support the olives, each cup having an aperture in the bottom, means at one index position for making an incision in the olive including a vertically-reciprocable cylindrical knife disposed above the table, and means to hold the olive in the cup when said knife withdraws from the olive after making the incision therein, and means at a subsequent index position for removing the pit from the olive through the incision therein including a pitting rubber adapted to be lowered over the olive and a vertically-reciprocable pitting tool disposed below said table and adapted to be projected up through the cup aperture and the olive, said pitting rubber having an aperture through which the pit is ejected by said tool.

3. An olive-pitting machine having means to support the olive, and means to make an incision in one end of the olive preparatory to removing the pit therefrom through said end comprising a cylindrical knife, the diameter of said knife being less than the thickness of the pit of the olive, an actuator for reciprocating said knife axially toward the pit, means for mounting said knife in said actuator for limited movement relative thereto, and spring means opposing said relative movement, whereby the depth of the incision is controlled by engagement of the knife with the pit.

4. An olive-pitting machine having means to support the olive, and means to make an incision in the olive preparatory to removing the pit therefrom comprising a cylindrical knife, the diameter of said knife being less than the thickness of the pit of the olive, an actuator for reciprocating said knife axially toward the pit, means for mounting said knife in said actuator for limited movement relative thereto, spring means opposing said relative movement, whereby the depth of the incision is controlled by engagement of the knife with the pit, and resilient means associated with said knife for retaining the olive in said supporting means during withdrawal of said knife from the olive.

5. An olive-pitting machine having means to support the olive, and means to make an incision in the olive preparatory to removing the pit therefrom comprising a cylindrical knife, an actuator for reciprocating said knife axially toward the pit, means for mounting said knife in said actuator for limited movement relative thereto, spring means opposing said relative movement, a plunger slidable in said knife, and spring means urging said plunger toward the olive, said plunger serving to retain the olive in said supporting means during the withdrawal of said knife.

6. An olive-pitting machine having means to support the olive, and means to make an incision in the olive preparatory to removing the pit therefrom comprising a cylindrical knife, an actuator for reciprocating said knife axially toward the pit, means for mounting said knife in said actuator for limited movement relative thereto, spring means opposing said relative movement, a plunger slidable in said knife and adapted to engage the surface of the olive, and means to limit the sliding movement of said plunger relative to said knife including an adjustable stop, whereby said stop can be adjusted to determine the depth of penetration of the knife into the olive.

7. An olive-pitting machine having a rotatable table, means on said table adapted to support an olive with its axis upright, means to make an incision in the olive preparatory to removing the pit comprising an actuator adapted to be vertically reciprocated through a stroke of fixed length, a cylindrical knife vertically slidable in said actuator, an adjustable stop to limit downward movement of said knife relative to said actuator, spring means opposing relative movement in the opposite direction, a plunger adapted to engage the surface of the olive vertically slidable in said knife, a stop to limit downward movement of said plunger relative to said knife, and spring means opposing relative movement of said plunger in the opposite direction.

8. An olive-pitting machine having a rotatable table, means on said table adapted to support an olive with its axis upright, means to make an incision in the olive preparatory to removing the pit comprising an actuator adapted to be vertically reciprocated through a stroke of fixed length, a cylindrical knife vertically slidable in said actuator, an adjustable stop to limit downward movement of said knife relative to said actuator, spring means opposing relative movement in the opposite direction, a plunger adapted to engage the surface of the olive vertically slidable in said knife, a stop to limit downward movement of said plunger relative to said knife, spring means opposing relative movement of said plunger in the opposite direction, and a second stop mounted in said knife to limit said opposite movement of said plunger.

9. An olive-pitting machine having a rotatable carrier adapted to be indexed to a plurality of positions, means on said carrier to support an olive, means including a reciprocatory cylindrical knife at one index position to make an incision in the olive preparatory to removal of the pit, and means at a subsequent index position for removing the pit, comprising a pitting rubber adapted to engage the olive and having a hole therein which registers with said incision, the diameter of said hole being less than the diameter of said knife, and a pitting tool adapted to be reciprocated axially through the olive to force the pit out of the olive through said incision and thence through said hole in said pitting rubber.

10. An olive pitting machine comprising means to support the olive, incising means to make an incision in the olive preliminary to removing the pit therefrom, and yieldable means operable within said incising means to hold the olive in the support while said incising means is being withdrawn from the olive after making the incision therein.

11. An olive pitting machine having an olive support, means comprising a cylindrical knife for making an incision in the olive preparatory to removing the pit therefrom, the diameter of said knife being less than that of the olive pit, actuating mechanism operatively associated with said knife for advancing the knife into an olive disposed in said support, and resilient means embodied in said actuating mechanism to enable the knife to yield upon engagement of the knife with said pit whereby the depth of the incision is determined by said engagement.

12. An olive pitting machine having an olive support, means comprising a cylindrical knife for making an incision in the olive preparatory to removing the pit therefrom, the diameter of said knife being less than that of the olive pit, an actuator for advancing the knife into an olive disposed in said support, said knife being mounted on said actuator for limited movement relative thereto, and a spring operatively associated with said knife and actuator to yieldingly oppose said relative movement whereby the depth of the incision is determined by engagement of the knife with the olive pit.

13. An olive pitting machine having olive supporting means, a reciprocable knife actuator movable toward and away from said olive supporting means, a cylindrical knife carried by said actuator for making an incision in one end of the olive preparatory to removing the pit therefrom through said end, said knife having a cutting edge smaller in diameter than the thickness of the pit, and yieldable means arranged on said knife between the latter and said actuator to resiliently urge said knife into the olive and to yield upon continued movement of said knife toward said olive supporting means when said knife is arrested by engagement with the pit of the olive, a pitting rubber engageable with said one end of the olive and having a central bore axially aligned with the latter, a pitting tool movable through said olive supporting means toward said pitting rubber whereby to press the pit of the olive through said incision in said central bore, and means for reciprocating said pitting tool.

CECIL A. BRITTEN.